(12) United States Patent
Bertsch

(10) Patent No.: US 9,147,094 B2
(45) Date of Patent: Sep. 29, 2015

(54) SMART CARD CONNECTOR COMPRISING A CONTACT ROCKER

(75) Inventor: Michael S. Bertsch, Heibronn (DE)

(73) Assignee: Amphenol Tuchel Electronics GmbH, Heilbronn (DE)

( * ) Notice: Subject to any disclaimer, the term of this patent is extended or adjusted under 35 U.S.C. 154(b) by 2 days.

(21) Appl. No.: 13/995,724

(22) PCT Filed: Dec. 30, 2011

(86) PCT No.: PCT/EP2011/006611
§ 371 (c)(1),
(2), (4) Date: Aug. 7, 2013

(87) PCT Pub. No.: WO2012/089347
PCT Pub. Date: Jul. 5, 2012

(65) Prior Publication Data
US 2013/0316556 A1    Nov. 28, 2013

(30) Foreign Application Priority Data
Dec. 31, 2010   (DE) .................. 10 2010 056 600

(51) Int. Cl.
*H01R 27/00* (2006.01)
*H01R 13/641* (2006.01)
*G06K 7/00* (2006.01)

(52) U.S. Cl.
CPC .............. *G06K 7/003* (2013.01); *G06K 7/0026* (2013.01); *G06K 7/0069* (2013.01)

(58) Field of Classification Search
CPC ...... H01R 27/00; H01R 23/684; H01R 12/79; H01R 12/88; H01R 2103/00; H01R 13/7032; H01R 13/641; H01R 13/6272; G06K 7/0021

USPC .................. 439/630, 260, 489, 188
See application file for complete search history.

(56) References Cited

U.S. PATENT DOCUMENTS

| 4,984,994 | A |   | 1/1991  | Yamamoto |
|-----------|---|---|---------|----------|
| 5,012,078 | A | * | 4/1991  | Pernet ............................ 235/441 |
| 5,151,847 | A | * | 9/1992  | Rautenberg ................... 361/737 |
| 5,395,259 | A | * | 3/1995  | Casses .......................... 439/188 |
| 6,126,466 | A | * | 10/2000 | Inadama ........................ 439/260 |
| 6,179,638 | B1| * | 1/2001  | Lim ............................... 439/260 |
| 6,354,881 | B1| * | 3/2002  | Bricaud et al. ................ 439/630 |
| 6,421,245 | B1| * | 7/2002  | Kashima ....................... 361/737 |
| 6,519,158 | B2| * | 2/2003  | Kashima ....................... 361/737 |
| 6,796,842 | B1|   | 9/2004  | Wang |
| 6,821,137 | B2| * | 11/2004 | Koser ............................ 439/260 |
| 7,955,103 | B2| * | 6/2011  | Konno et al. ................. 439/188 |
| 2004/0023541 | A1 | * | 2/2004 | Wang ............................ 439/260 |
| 2008/0305666 | A1 | * | 12/2008 | Lin et al. ....................... 439/260 |

FOREIGN PATENT DOCUMENTS

| DE | 4336192 A1   | 5/1995 |
| DE | 19502176 A1  | 8/1996 |
| WO | 98/24045 A1  | 6/1998 |

* cited by examiner

*Primary Examiner* — Gary Paumen
(74) *Attorney, Agent, or Firm* — Blank Rome LLP

(57) ABSTRACT

This invention relates to a smart card connector (10) which has the following: a contact carrier (11) which bears read contact elements (11) which have read contacts, a cover (12) which via a top (139) of the contact carrier (11) is fastened to the latter and forms a card receiving space, a read contact element lifting device (14) which is pivotally mounted in the contact carrier, and contact/lifting surfaces made on the read contact element lifting device (14), on which surfaces the read contact elements rest, when a card which strikes the lifting device (14) is pushed in, the read contacts (171, 172) being moved into contact with the card contacts.

17 Claims, 4 Drawing Sheets

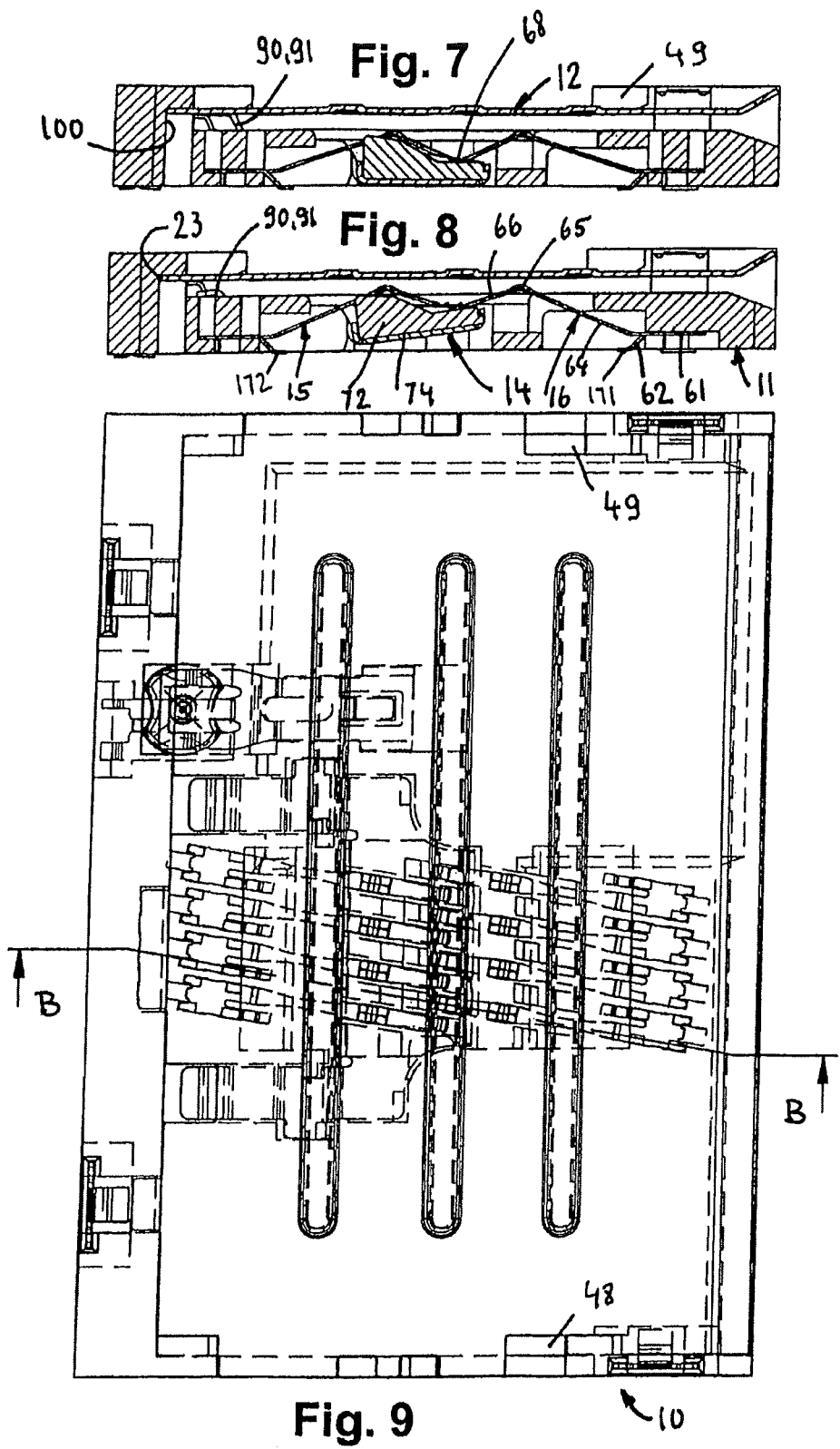

SMART CARD CONNECTOR COMPRISING A CONTACT ROCKER

CROSS-REFERENCE TO RELATED APPLICATIONS

This application is a National Phase of Application No. PCT/EP2011/006611 filed Dec. 30, 2011, which claims the benefit of German Patent Application No. 102010056600.4 filed on Dec. 31, 2010, which are incorporated herein by reference in their entirety.

The invention relates to a device for making contact with a chip card or a smart card (for short: SC or card) by means of a smart card connector (for short: SCC) or chip card reader.

Smart card connectors generally have a housing in which contact elements, especially read contact elements (for short: LKE) are located which are engaged to card contacts or contact surfaces (for short: KK) provided on the smart card in order to read out the information stored in the card or to feed information into it. The smart card connector generally has contact terminals which provide the connection to any circuits or devices which are to be connected to the card contacts.

The smart card connector as claimed in the invention has a contact carrier which is fitted with read contact elements. The latter on one end which is used to make contact with the card contacts have read contacts and on the other end terminal contacts. Preferably the read contact elements are arranged obliquely so that all read contacts meet on a line with a uniform distance.

Following the outfitting of the contact carrier with the read contacts, have read contact elements [sic], a rocker is swiveled into the contact carrier and is pivotally latched in it.

The rocker has a base body which is made of sheet metal and on which a plastic guide which forms insulating trigger flanks for the LKE is applied and attached.

In order to avoid overloading of the read contacts (especially also in their read position) the rocker has an end stop as a limit.

When the end stop or the rocker limit is reached, trigger flanks of the rockers can equalize additional tolerances of the card and installation by subsequent resilience.

By using a rocker, when the card is in the read position, a card ejection component cannot develop, as is known for example in spring-loaded slides. For this reason in the rocker concept as claimed in the invention additional retaining elements such as for example brake springs are omitted.

In known smart card connectors with contact elements which are mounted pretensioned and which are released by a rocker, the pretensioning of the contact elements can be partially lost in the soldering process; this can lead to a distortion of the contact carrier.

Other advantages, objectives and details of the invention will become apparent from the following description of one exemplary embodiment using the drawings.

FIG. 7 shows a section along line B-B according to which a card is still not inserted into the smart card connector so that the rocker is in its initial position and the read contact elements are not yet moved into their contact position;

FIG. 8 shows a sectional view similar to FIG. 7, and here the card can be considered inserted and would be in its read position in which the read contact elements would be in their contact position if the card were shown;

FIG. 9 shows a schematic plan view of the smart card connector of FIGS. 1-8.

Figure 1:
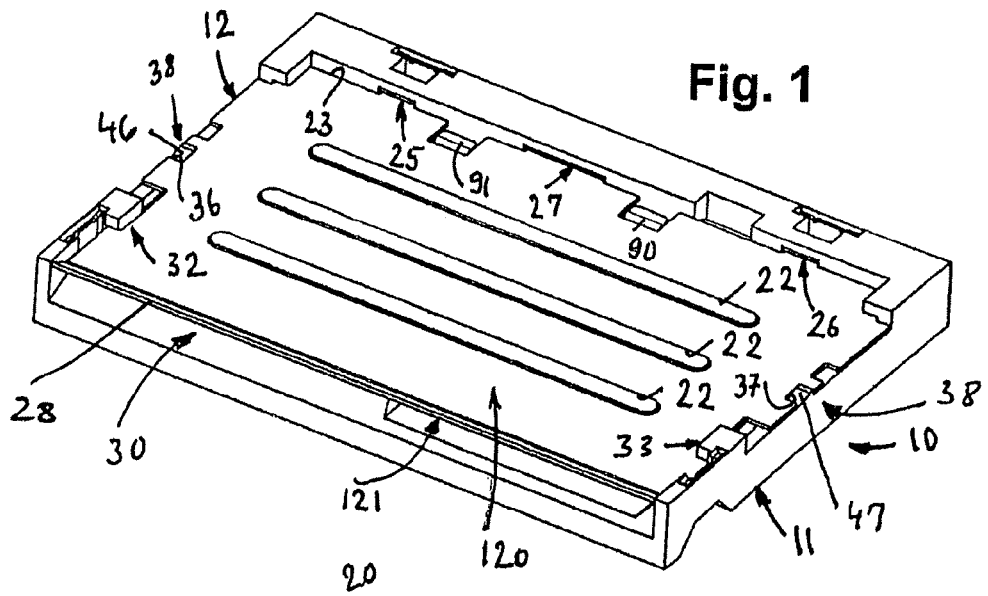
FIG. 1 shows a perspective plan view, obliquely from forward at the top, of a smart card connector as claimed in the invention.

FIGS. 1-9 show a smart card connector 10 which has a contact carrier 11 and a cover 12 which closes it on the top 139 of the contact carrier. Between the top 139 and a bottom of the cover 12 a card receiving space for a smart card (hereinafter card) which is to be inserted and which is not shown is formed.

In the smart card connector 10, especially inserted into its contact carrier 11, a read contact element lifting device preferably in the form of a rocker 14 is pivotally mounted. The latter is turned when a card is pushed into the card receiving space and causes the read contact elements 1, 2 which are located preferably in two rows 15 and 16 to be actuated, preferably lifted, in order to make contact by its read contacts 65 with the card contacts provided on the card.

Figure 2:
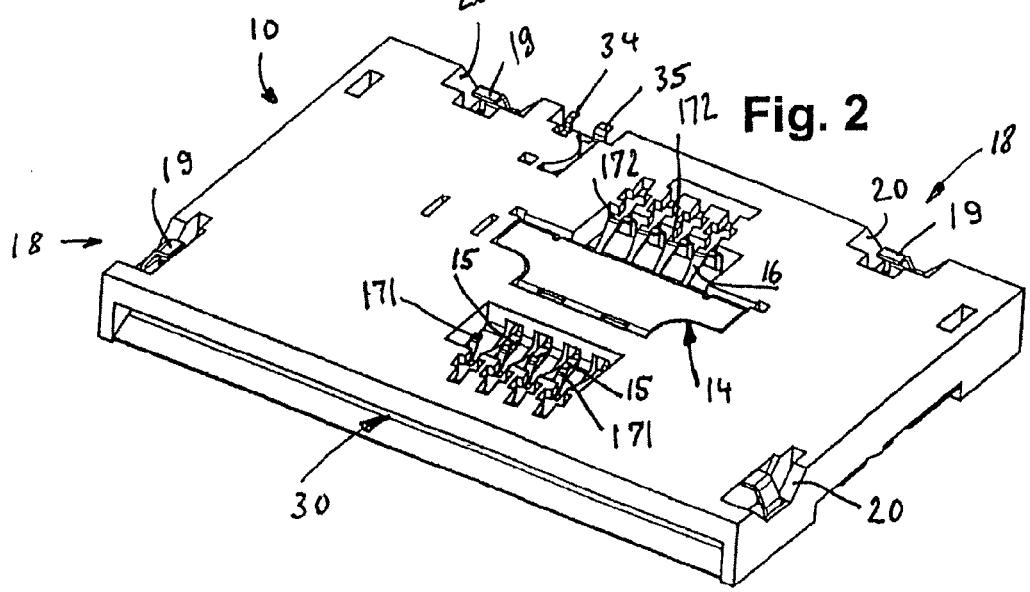
FIG. 2 shows a plan view of the bottom of the smart card connector of FIG. 1.

The contact elements 1, 2 which are to be detailed as also shown in FIG. 2 have terminal contacts 171, 172 which can be connected to a connected device which has access to the information stored on the card.

Cover 12

The cover 12 is fastened on the contact carrier 11 by cover locking means 18 which have cover-side locking means 19 in the form of spring arms and contact carrier-side locking means 20 in the form of recesses. The cover 12 which consists preferably of sheet metal has grooves 22 which are made on its top 120 and which on the bottom 121 of the cover form arches which can interwork with the contact elements 1, 2.

The cover 12 has a rear stop edge 23. Furthermore cover retainers 25, 26, 27 are designed to keep the rear edge of the cover 12 on the contact carrier 11. The cover 12 oppositely to the rear stop edge forms an exposed, arched front edge 28 which borders a card insertion slot 30 to the top. Furthermore on opposite longitudinal sides of the cover 12 there are lateral cover retainers 32 and 33.

Figure 3:
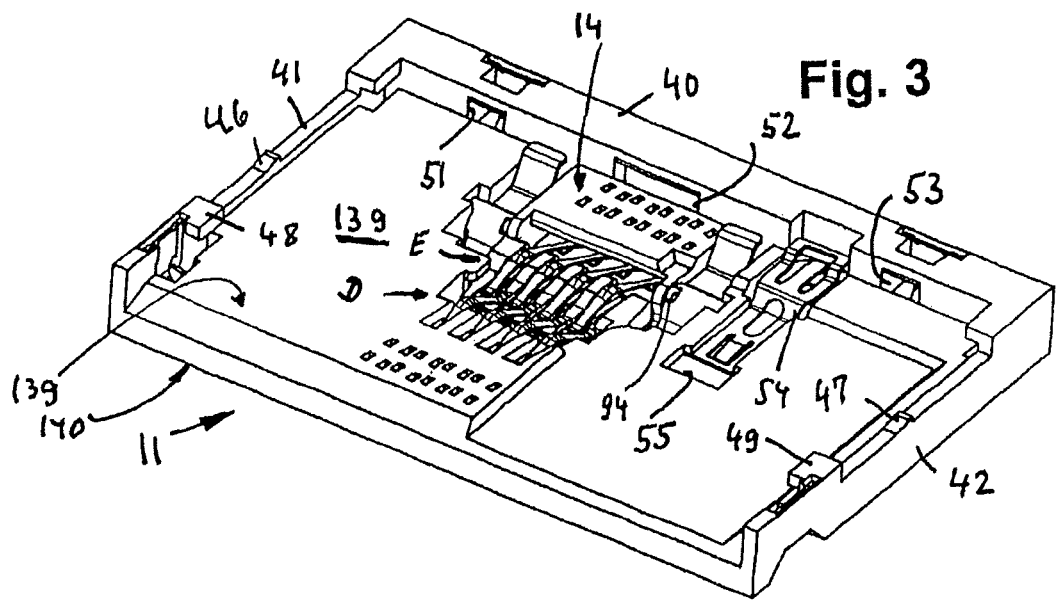
FIG. 3 shows the smart card connector of FIG. 1 with the cover removed in its initial position with the card not inserted.
Figure 4:
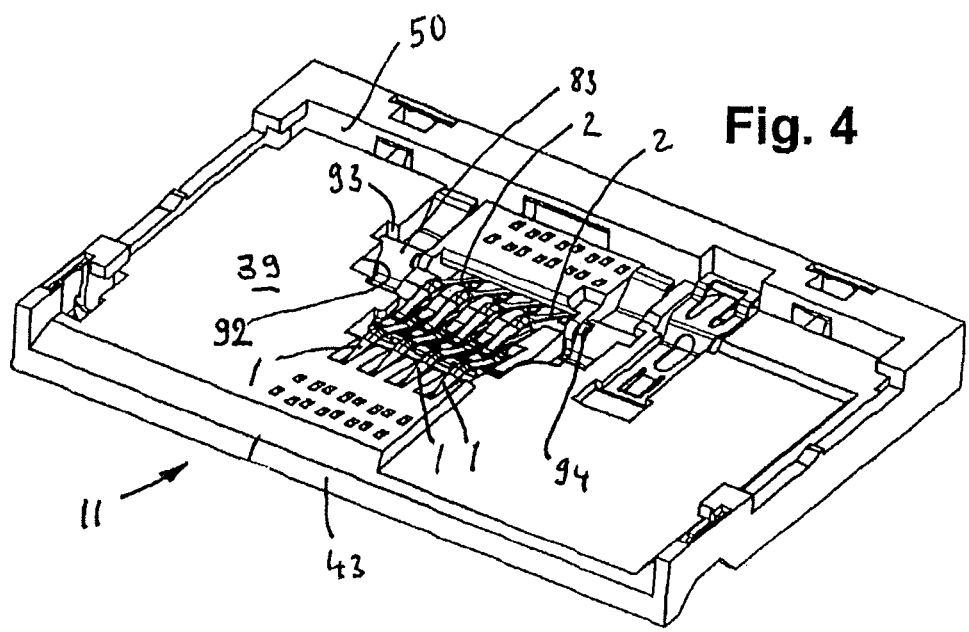
FIG. 4 shows the smart card connector of FIG. 3, and here a smart card can be considered inserted.

FIG. 2 shows two terminal contacts 34, 35 of a card presence switch 54 which is shown in FIG. 3. These terminal contacts 34, 35 are preferably at the same height or at the same level as the terminal contacts 171, 172 of the contact elements 1, 2.

On either side, diametrically opposite, the cover 12 forms one recess 36, 37 at a time in order to form cover latches 38 together with cams 46, 47 of the contact carrier 11 which are to be described.

Contact Carrier 11

The contact carrier 11 as the base body has a contact carrier plate 39 which consists of plastic and which has a top and a bottom. Roughly in the middle in the contact carrier plate 39 a rocker opening 92 which penetrates the latter is formed and is used to accommodate and support the rocker 14. The contact carrier plate 39 is preferably molded in one piece to a rear wall 40, a left side wall 41 and a right side wall 42. On the front 43 of the contact carrier plate 39 a sloped surface is formed which facilitates the insertion of the card into the card insertion slot 30.

On the tops of the left and right side walls 41, 42, a cam 46, 47 projecting upward is made, as already mentioned. The two side walls 41, 42 form projections 48, 49 which point to the inside and which fix the cover 12 to the top. The rear wall 40 forms a card stop surface 50 which is adjoined by the card when it has been pushed into its read position. In the vertical wall of the rear wall 40 furthermore holes, for example three holes 51, 52, 53, are made spaced apart into which, for purposes of retaining the cover, cover projections formed by the cover project when the cover 12 is in its attachment position. The already mentioned card presence switch 54 is inserted into a recess 55 in the contact carrier plate 39 and fastened in it.

Contact Elements 1, 2

The contact elements 1, 2 which are used especially as read contact elements are inserted into the contact carrier 11, especially the contact carrier plate 39, and latched in it. The contact elements 1, 2 are preferably not pretensioned in the direction to the read contacts 1, 2. Preferably (compare FIG. 3) the LKE 1, 2 are arranged in two groups D (LKE 1) and E (LKE 2). The LKE 1, 2 of each group run parallel to one another, all terminal contact ends of each group D, E (compare FIGS. 3 and 4 in this regard) meeting on a line and being uniformly spaced.

In particular, each read contact element 1, 2, as shown for example in FIG. 8, has a mounting segment 61 which ensures fastening of the contact element 1, 2 to the contact carrier plate 39 in the illustrated manner. Preferably adjacent to the mounting segment 61 the contact element 1, 2 forms a terminal segment 62 which preferably forms a terminal contact (as the contact end) 171, 172 on its free end.

The mounting segment 61 is adjoined running preferably angled relative to the mounting segment 61 by a read contact segment 64 which on its highest end shown in FIG. 8 forms a read contact 65 preferably in the form of a contact hump. Following the read contact 65 the contact element 1, 2 forms an actuating segment 66 which runs obliquely down and which preferably on its free end ends in one support end or actuating end preferably ends in the form of a rounding 68 which rests preferably elastically on the rocker 14.

Rocker 14

Figure 5:
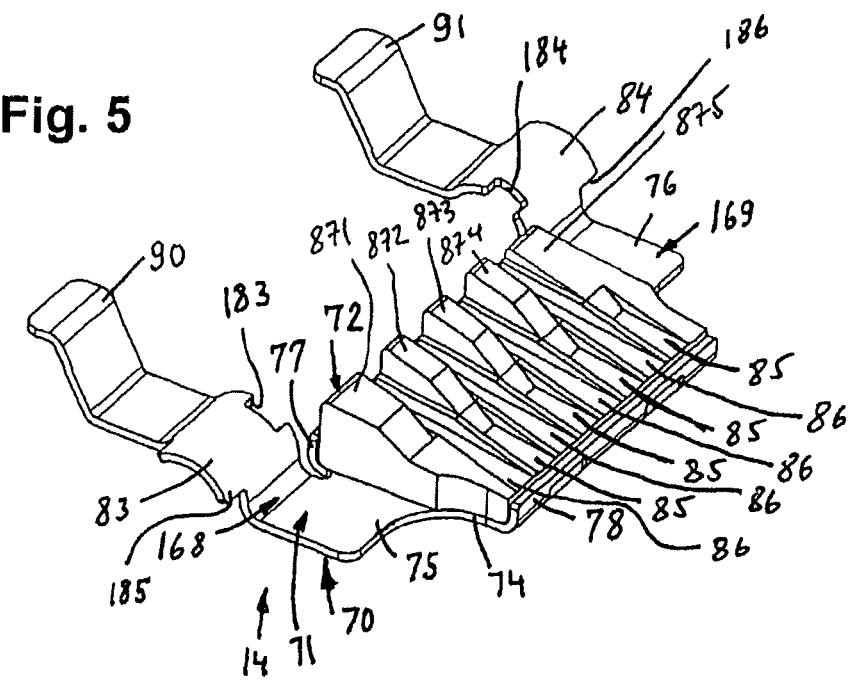
FIG. 5 shows a plan view of the top of a rocker.
Figure 6:
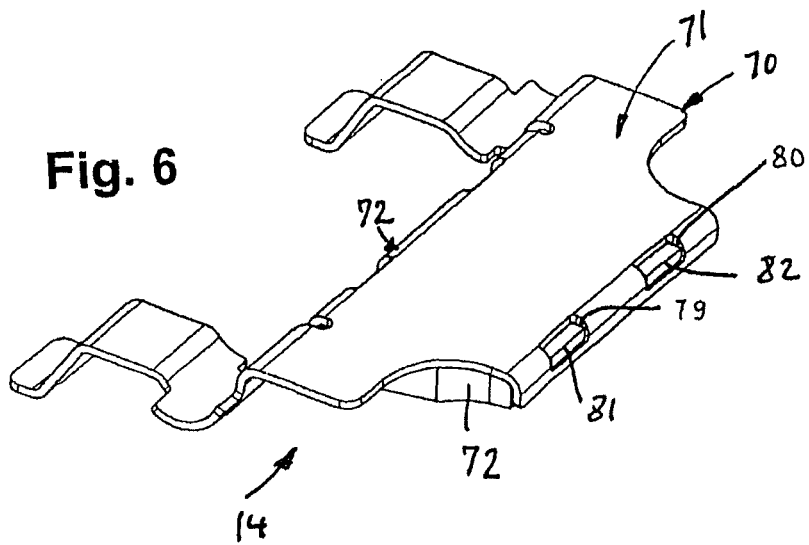
FIG. 6 shows a plan view of the bottom of the rocker of FIG. 5.

The rocker 14 which is shown in detail in FIGS. 5 and 6 has a base body 70 which is preferably formed by a bearing sheet 71. A contact guide preferably in the form of a guide body 72 is fastened to the base body 70 or the bearing sheet 71 which forms the base body 70. The contact guide 72 which consists preferably of plastic is supported on its bottom which is shown in FIG. 5 by a support segment 74 of the base body 70. The support segment 74 on its two transverse sides has a side segment 75 and a side segment 76. The side segment 75 is a part of a side arm 168 which is formed by the base body 70 and the side segment 169 is a part of a side arm 69 which is formed by the base body 70. The support segment 74 furthermore forms encapsulation segments 77 and 78 which are placed around the back and front of the contact guide 72. The encapsulation segment is made as shown in FIG. 6. The front encapsulation segment 78 has two slots 79, 80 into which projections 81, 82 of the plastic guide body project for purposes of retention.

The two side arms 168, 169 are preferably made in mirror-image but identically. Each of the side arms 168 and 169 has following the side section 75, 76 a bearing segment 83, 84 which is adjoined in turn by one actuating segment 90, 91 respectively. The actuating segments 90, 91, as shown, are angled twice.

The bearing segments 83 and 84 each form one projection 185 and 186 which runs laterally to the outside and one cutout 183 and 184 which points to the inside.

The contact guide 72 which consists preferably of insulating plastic, as shown especially in FIG. 5, forms projections 871, 872, 873, 874, 875 which extend upward and which are spaced laterally relative to one another in the transverse direction.

Between the projections 871-875 there are trigger flanks 85, i.e. contact/lifting surfaces for the contact elements 1, 2.

Between the projections 871 to 875 there are trigger flanks 85 for the contact elements 1 of the first group D and spaced away from them in the transverse direction there are trigger flanks 86 for the contact elements 2 of the second group E of contact elements 2.

The rocker 14 which is to be pivotally supported in the contact carrier plate 39 is inserted into the rocker opening 92, especially bearing recesses 93, 94 which are molded in the contact carrier plate 39, is swiveled in and latched in a latching position. In the latter the rocker 14 can turn in order to reach the contact element positions which are shown in FIGS. 7 and 8.

The rocker 14 is pivotally mounted in particular by its two laterally spaced bearing segments 83, 84 which interwork with laterally spaced bearing recesses in the corresponding side walls. In order to reach its bearing position, the rocker 14 in an almost vertical position is inserted into the rocker opening 92 and the bearing recesses 93, 94 such that the bearing segments 83, 84 pass through those formed by the bearing recesses 93, 94 [sic] in order to then latch on correspondingly made surfaces of the contact carrier such that rotary motion of the rocker 14 is possible which is necessary when the card is inserted in order to raise the contact elements 1, 2 into the card receiving space so that they come into contact with the card contacts.

The result of the rotary motion of the rocker 14 is illustrated especially in FIGS. 7 and 8. In FIG. 7 the rocker 14 is in its unswiveled position where the corresponding contact elements 1, 2 are not raised. In FIG. 8 the rocker is shown turned. It can be recognized that the contact elements 1, 2 are raised so that their contact humps or the read contacts 65 would make contact with the card contact if the card were also shown.

The rotary motion of the rocker 14 when the card is inserted is initiated when the front edge of the card hits the actuating segments 90, 91. Compare in this regard also FIG. 7. In this position of the card it adjoins a contact surface 100 which is formed by the contact carrier 11 (compare in this respect FIG. 7).

The rotary motion of the rocker 14 lifts the contact elements 1, 2 which with their actuating segment 66, especially the roundings 68, rest on the trigger flanks 85, 86 in order to make contact with the card contacts.

When a card is removed, the rocker 14 is moved back into the position shown in FIG. 7 by the spring force of the resting contact elements 1 and 2.

In order to avoid overloading of the read contacts 1, 2 the rocker 14 has an end stop as a limit. When the limit is reached the trigger flanks can equalize additional tolerances of the card and installation by subsequent resilience.

The rocker concept as claimed in the invention ensures that the card which is in the read position does not apply a force which has an ejection component, as is the case in other chip card readers or smart card connectors. In this way additional retaining elements, such as for example brake springs, are omitted.

In the rocker design as claimed in the invention the contact elements need not be mounted pretensioned. When card elements have to be mounted pretensioned, there is a risk that in a soldering process the pretensioning of the contact elements is partially lost; this can lead to "distortion" of the contact carrier.

Because in the base position or initial position, compare FIG. 7, there are contacts or contact elements recessed in the contact carrier 11, the card can be inserted into the smart card reader without friction. Only shortly before the card end stop 100 the contact elements 1, 2, especially the read contacts 65, i.e. the contact surfaces of the contact elements 1, 2, are actively raised by the rocker. In the read position the card is held by the clamping force applied by the read contact elements.

REFERENCE NUMBER LIST 1 contact element
2 contact element
10 smart card connector
11 contact carrier
12 cover
14 rocker
Cover 12
15 first row of contact elements
16 second row of contact elements
18 cover locking means
19 cover-side locking means, spring arm
20 contact carrier-side locking means, recess
22 grooves
23 rear stop edge
25 cover retainer
26 cover retainer
27 cover retainer
28 arched front edge
30 card insertion slot
31 lateral cover retainer
33 lateral cover retainer
34 terminal contact of the KAS
35 terminal contact of the KAS
36 recess
37 recess
38 cover latches
39 contact carrier plate
54 card presence switch (KAS)
139 top of the contact carrier
140 bottom of the contact carrier
171 terminal contacts
172 terminal contacts
Contact Carrier 11
39 contact carrier plate
40 rear wall
41 left side wall
42 right side wall
43 front
46 cam
47 cam
48 projection
49 projection
50 card stop surface
51 hole
52 hole
53 hole
54 card presence switch
55 recess
Contact Elements 1, 2
61 actuating segment
62 terminal segment
171, 172 terminal contact
64 read contact segment
65 read contact, contact hump
66 actuating segment
68 support end or actuating end in the form of a rounding
70 base body of the rocker
71 bearing sheet
72 contact guide, guide body
74 support segment
75 side segment as part of one side arm 68
76 side segment as part of one side arm 69
77 encapsulation segment
78 encapsulation segment
79 slot
80 slot
81 projection
82 projection
83 bearing segment
84 bearing segment
85 trigger flanks; contact/lifting surfaces for contact elements
86 trigger flanks; contact/lifting surfaces for contact elements
90 actuating segment
91 actuating segment
92 rocker opening
93 bearing recess
94 bearing recess
100 end stop
120 top of the cover
121 bottom of the cover
139 top of the contact carrier
140 bottom of the contact carrier
168 side arm
169 side arm
183 cutout
184 cutout
185 projection
186 projection
871-875 projections

The invention claimed is:

1. A smart card connector which has the following:
a contact carrier which bears read contact elements which have read contacts;
a cover which via a top of the contact carrier is fastened to the latter and forms a card receiving space; and
a read contact element lifting device which is pivotally mounted in the contact carrier, and contact/lifting surfaces made on the read contact element lifting device, on which surfaces the read contact elements rest, when a card which strikes the lifting device is pushed in, the read contacts being moved into contact with the card contacts,
wherein the read contact element lifting device includes a rocker that has a base body and a contact guide disposed on the base body.

2. A smart card connector as claimed in claim 1, wherein the contact/lifting surfaces are made as trigger flanks on the rocker.

3. A smart card connector as claimed in claim 2, wherein the base body is made of sheet metal and the contact guide is made of plastic.

4. A smart card connector as claimed in claim 1, wherein in order to avoid overloading of the read contacts the rocker has an end stop as a limit so that when the end stop is reached, trigger flanks of the rockers can equalize additional tolerances of the card and installation by subsequent resilience.

5. A smart card connector as claimed in claim 1, wherein the cover consists of sheet metal and has grooves which are made on its top and which on the bottom of the cover form arches which can interwork with the contact elements.

6. A smart card connector as claimed in claim 1, wherein there is a card presence switch which has two terminal contacts and wherein these terminal contacts are at the same height or at the same level as the terminal contacts of the contact elements.

7. A smart card connector as claimed in claim 1, wherein on either side, diametrically opposite, the cover has one recess at a time in order to form cover latches together with cams of the contact carrier.

8. A smart card connector as claimed in claim 1, wherein the contact carrier as the base body has a contact carrier plate in which roughly in the middle a rocker opening which penetrates the plate is formed which is used to accommodate and support the rocker.

9. A smart card connector as claimed in claim 1, wherein each read contact element has the following: a mounting segment adjacent to the mounting segment, a terminal segment which on its free end forms a terminal contact, the mounting segment being adjoined running angled relative to the mounting segment by a read contact segment which on its highest end forms a read contact in the form of a contact hump.

10. A smart card connector as claimed in claim 1, wherein the contact guide is supported on its bottom by a support segment of the base body, which on its two transverse sides has side segments, the side segment being a part of the side arm which is formed by the base body, the support segment forming encapsulation segments which are placed around the back and front of the contact guide, and the front encapsulation segment having two slots into which projections of the contact guide body project for purposes of retention.

11. A smart card connector as claimed in claim 1, wherein bearing segments of the rocker each forms one projection which runs laterally to the outside and forms one cutout which points to the inside.

12. A smart card connector as claimed in claim 1, wherein the contact guide forms projections which extend upward and which are spaced laterally relative to one another in the transverse direction such that between them trigger flanks.

13. A smart card connector as claimed in Claim 1, wherein the rocker which is pivotally mounted in the contact carrier plate is inserted into bearing recesses, is swiveled in and pivotally latched in a latching position.

14. A smart card connector as claimed in claim 1, wherein the rocker is pivotally mounted by its two laterally spaced bearing segments which interwork with laterally spaced bearing recesses in the corresponding side walls.

15. A s art card connector which has the following:
a contact carrier which bears read contact elements which have read contacts;
a cover which via a top of the contact carrier is fastened to the latter and forms a card receiving space, the cover consists of sheet metal and has grooves which are made on its top and which on the bottom of the cover form arches which can interwork with the contact elements; and
a read contact element lifting device which is pivotally mounted in the contact carrier. and contact/lifting surfaces made on the read contact element lifting device, on which surfaces the read contact elements rest, when a card which strikes the lifting device is pushed in, the read contacts being moved into contact with the card contacts.

16. A smart card connector which has the following:
a contact carrier which bears read contact elements which have read contacts;
a cover which via a top of the contact carrier is fastened to the latter and forms a card receiving space, and on either side, diametrically opposite, the cover has one recess at a time in order to form cover latches together with cams of the contact carrier; and
a read contact element lifting device which is pivotally mounted in the contact carrier, and contact/lifting surfaces made on the read contact element lifting device, on which surfaces the read contact elements rest, when a card which strikes the lifting device is pushed in, the read contacts being moved into contact with the card contacts.

17. A smart card connector which has the following:
a contact carrier which bears read contact elements which have read contacts;
a cover which via a top of the contact carrier is fastened to the latter and forms a card receiving space; and
a read contact element lifting device which is pivotally mounted in the contact carrier, and contact/lifting surfaces made on the read contact element lifting device, on which surfaces the read contact elements rest, when a card which strikes the lifting device is pushed in, the read contacts being moved into contact with the card contacts,
wherein the read contact element lifting device includes bearing segments, each bearing segment forms one projection which runs laterally to the outside and forms one cutout which points to the inside.

* * * * *